(12) United States Patent
Wang et al.

(10) Patent No.: US 10,748,080 B2
(45) Date of Patent: Aug. 18, 2020

(54) METHOD FOR PROCESSING TENSOR DATA FOR PATTERN RECOGNITION AND COMPUTER DEVICE

(71) Applicant: SHENZHEN INSTITUTES OF ADVANCED TECHNOLOGY, Shenzhen (CN)

(72) Inventors: Shuqiang Wang, Shenzhen (CN); Dewei Zeng, Shenzhen (CN); Yanyan Shen, Shenzhen (CN); Changhong Shi, Shenzhen (CN); Zhe Lu, Shenzhen (CN)

(73) Assignee: Shenzhen Institutes of Advanced Technology, Guangdong, Shenzhen (CN)

( * ) Notice: Subject to any disclaimer, the term of this patent is extended or adjusted under 35 U.S.C. 154(b) by 801 days.

(21) Appl. No.: 15/310,330

(22) PCT Filed: Dec. 4, 2015

(86) PCT No.: PCT/CN2015/096375
§ 371 (c)(1),
(2) Date: Nov. 10, 2016

(87) PCT Pub. No.: WO2017/092022
PCT Pub. Date: Jun. 8, 2017

(65) Prior Publication Data
US 2017/0344906 A1 Nov. 30, 2017

(51) Int. Cl.
*G06N 20/00* (2019.01)
*G06N 5/00* (2006.01)
(Continued)

(52) U.S. Cl.
CPC .............. *G06N 20/00* (2019.01); *G06F 17/16* (2013.01); *G06K 9/6232* (2013.01); *G06N 5/003* (2013.01)

(58) Field of Classification Search
CPC ....... G06N 20/00; G06F 17/16; G06K 9/6232
(Continued)

(56) References Cited

U.S. PATENT DOCUMENTS 7,805,388 B2 * 9/2010 Weston ................. G16B 40/00
706/20
7,970,718 B2 * 6/2011 Guyon ................. G06K 9/6231
706/20

(Continued)

FOREIGN PATENT DOCUMENTS

CN 103886329 6/2014
CN 104361318 2/2015
(Continued)

OTHER PUBLICATIONS

Kotsia et al., "Higher rank Support Tensor Machines for visual recognition", May 18, 2012, Elsevier journal 45 Pattern Recognition, pp. 4192-4203. (Year: 2012).*

(Continued)

*Primary Examiner* — Miranda M Huang
*Assistant Examiner* — Chase P. Hinckley
(74) *Attorney, Agent, or Firm* — Hamre Schumann, Mueller & Larson, P.C.

(57) ABSTRACT

A method for processing tensor data for pattern recognition and a computer device are provided. The method includes: constructing a decision function by the optimal projection tensor W which has been rank-one decomposed together with the offset scalar b, and inputting to-be-predicted tensor data which has been rank-one decomposed into the decision function for prediction.

2 Claims, 2 Drawing Sheets

(51) Int. Cl.
G06K 9/62 (2006.01)
G06F 17/16 (2006.01)
(58) Field of Classification Search
USPC .......................................................... 706/12
See application file for complete search history.

(56) References Cited

U.S. PATENT DOCUMENTS

| | | | | |
|---|---|---|---|---|
| 9,099,083 | B2* | 8/2015 | Deng | G10L 15/063 |
| 2005/0177040 | A1* | 8/2005 | Fung | G06K 9/6234 |
| | | | | 600/407 |
| 2007/0109320 | A1* | 5/2007 | Skibak | G06T 11/001 |
| | | | | 345/611 |
| 2007/0122041 | A1* | 5/2007 | Moghaddam | G06K 9/6234 |
| | | | | 382/224 |
| 2011/0026811 | A1* | 2/2011 | Kameyama | G06K 9/4642 |
| | | | | 382/159 |
| 2011/0142311 | A1* | 6/2011 | Felsberg | G06T 11/006 |
| | | | | 382/131 |
| 2012/0089551 | A1* | 4/2012 | Ebadollahi | G06N 5/047 |
| | | | | 706/48 |
| 2012/0128238 | A1* | 5/2012 | Kameyama | G06T 3/4053 |
| | | | | 382/159 |
| 2014/0153692 | A1* | 6/2014 | Larkin | G06T 5/10 |
| | | | | 378/36 |
| 2014/0181171 | A1* | 6/2014 | Dourbal | G06F 17/16 |
| | | | | 708/607 |
| 2014/0219563 | A1* | 8/2014 | Rodriguez-Serrano | |
| | | | | G06K 9/18 |
| | | | | 382/182 |
| 2014/0300869 | A1* | 10/2014 | Hirsch | G02B 27/2214 |
| | | | | 353/7 |
| 2015/0268058 | A1* | 9/2015 | Samarasekera | G06K 9/00637 |
| | | | | 701/409 |
| 2016/0004664 | A1* | 1/2016 | Bouchard | G06F 17/16 |
| | | | | 708/201 |
| 2016/0035093 | A1* | 2/2016 | Kateb | A61B 5/0042 |
| | | | | 382/131 |
| 2017/0011280 | A1* | 1/2017 | Soldevila | G06K 9/00362 |
| 2017/0091528 | A1* | 3/2017 | Savvides | G06K 9/0014 |
| 2017/0257649 | A1* | 9/2017 | Bourouihiya | H04N 21/2347 |
| 2017/0323049 | A1* | 11/2017 | Cheremovsky | G06F 17/16 |

FOREIGN PATENT DOCUMENTS

| | | |
|---|---|---|
| CN | 104850913 | 8/2015 |
| CN | 105069485 | 11/2015 |
| CN | 105654110 | 6/2016 |
| JP | 2000035394 | 2/2000 |

OTHER PUBLICATIONS

Xu et al., "Rank-one Projections with Adaptive Margins for Face Recognition", 2006 IEEE Computer Society Conference on Computer Vision and Pattern Recognition. (Year: 2006).*
Guo et al., "Tensor Learning for Regression" Jan. 18, 2012, IEEE Transactions on Image Processing vol. 21, pp. 816-827. (Year: 2012).*
Fertig et al., "Dual Forms for Constrained Adaptive Filtering" Jan. 1994 IEEE Transactions on Signal Processing, vol. 42, pp. 11-23. (Year: 1994).*
Cichocki et al., "Tensor Decompositions for Signal Processing Applications" Feb. 12, 2015 IEEE Signal Processing Magazine, pp. 145-163. (Year: 2015).*
Sorber et al., "Structured Data Fusion" May 12, 2015 IEEE Journal of Selected Topics in Signal Processing, vol. 9, No. 4, pp. 586-600. (Year: 2015).*
Liu et al., "Nonnegative Tensor Cofactorization and Its Unified Solution" Jul. 28, 2014 IEEE Transactions on Image Processing, vol. 23, No. 9, pp. 3950-3961. (Year: 2014).*
Cyganek, Boguslaw "A Framework for Data Representation, Processing, and Dimensionality Reduction with Best-Rank Tensor Decomposition" Jun. 25-28, 2012, Proceedings of the ITI 2012 34th Int. Conf. on Information Technology Interfaces, pp. 325-330. (Year: 2012).*
Hua et al., "Face Recognition using Discriminatively Trained Orthogonal Rank One Tensor Projections" 2007 IEEE. (Year: 2007).*
Stankovic et al., "Some Properties of ET-Projective Tensors Obtained from Weyl Projective Tensor". Jan. 2015 Filomat ResearchGate, pp. 572-584. (Year: 2015).*
Tao et al., "Supervised Tensor Learning" 2005 IEEE 5th International Conference on Data Mining. (Year: 2005).*
Wang et al., "Rank-R Approximation of Tensors Using Image-as-Matrix Representation" Jul. 25, 2005 IEEE Computer Society Conference on Computer Vision and Pattern Recognition. (Year: 2005).*
Wu et al., "Local Discriminative Orthogonal Rank-One Tensor Projection for Image Feature Extraction" 2011 IEEE, pp. 367-371. (Year: 2011).*
Gullberg et al., "Efficient cardiac diffusion tensor Mri by three-dimensional reconstruction of solenoidal tensor fields" 2001 Medical Resonance Imaging, No. 19, pp. 233-256. (Year: 2001).*
Gullberg et al., "Backprojection Filtering Algorithms for Reconstruction of Vector and Second Order Tensor Fields" Oct. 15-20, 2000 IEEE Nuclear Science Symposium, No. 15, pp. 277-281. (Year: 2001).*
Gullberg et al., "MRI diffusion tensor reconstruction with PROPELLER data acquisition" 2004 Magnetic Resonance Imaging, No. 22, pp. 139-148. (Year: 2004).*
Kouchaki et al., "Complex Tensor based Blind Source Separation of EEG for Tracking P300 Subcomponents" Aug. 25-29, 2015, 37th Annual International Conference of the IEEE Engineering in Medicine and Biology Society, pp. 6999-7002. (Year: 2015).*
Tremoulheac, Benjamin R., "Low-rank and sparse reconstruction in dynamic magnetic resonance imaging via proximal splitting methods", Dec. 2014, University College London, pp. 1-189. (Year: 2014).*
Zhong et al., "Structured partial least squares for simultaneous object tracking and segmentation" Jan. 9, 2014, Neurocomputing, No. 133, pp. 317-327. (Year: 2014).*
Schultz, Jussi "Quantum Tomography with Phase Space Measurements" 2012, University of Turku, pp. 1-55. (Year: 2012).*
Kopsen, Kristian, "Improving visualisation of bronchi in three-dimensional rendering of CT data" Jan. 2007, University of Linkopings, pp. 1-87. (Year: 2007).*
Fornasier et al., "Compressive Sensing" 2015, Springer, pp. 205-256. (Year: 2015).*
Hou et al., "Multiple rank multi-linear SVM for matrix data classification" Jul. 15, 2013, Pattern Recognition, No. 47, pp. 454-469. (Year: 2013).*
Anandkumar et al., "When are Overcomplete Topic Models Identifiable? Uniqueness of Tensor Tucker Decompositions with Structured Sparsity" Jan. 2015, Journal of Machine Learning Research, No. 16, pp. 2643-2694. (Year: 2015).*
Sun, Liang, "Multi-Label Dimensionality Reduction" Aug. 2011, Doctoral Dissertation, Arizona State University, pp. i-186. (Year: 2011).*
Jayaraman, Thiagarajan, "Sparse Methods in Image Understanding and Computer Vision" May 2013, Doctoral Dissertation, Arizona State University, pp. i-244. (Year: 2013).*
Gurumoorthy et al., "A Method for Compact Image Representation Using Sparse Matrix and Tensor Projections Onto Exemplar Orthonormal Bases" Feb. 2010, IEEE Transactions on Image Processing, vol. 19, No. 2, pp. 322-334. (Year: 2010).*
Tao et al., "Supervised Tensor Learning" 2005, Proceedings of the Fifth IEEE International Conference on Data Mining. (Year: 2005).*
Yin et al., "Image super-resolution via 2D tensor regression learning" Dec. 5, 2014, Computer Vision and Image Understanding, No. 132, pp. 12-23. (Year: 2014).*

* cited by examiner

METHOD FOR PROCESSING TENSOR DATA FOR PATTERN RECOGNITION AND COMPUTER DEVICE

FIELD OF THE INVENTION

The present application belongs to the technical field of pattern recognition, especially to a method for processing tensor data for pattern recognition and a computer device.

BACKGROUND OF THE INVENTION

With the advent of big data era, tensor expression of data has been widely used. However, during achieving the invention, the inventor found out that in prior art vector model algorithm is still utilized to process tensor data. On the basis of the concept of vector model algorithm, during a preprocessing phase, feature extraction for original data (vectorization) should be performed, which firstly is easy to destroy spatial information and inner correlation which are specific to tensor data, secondly possesses superabundant modern parameters which would easily lead to issues such as curse of dimensionality, over learning and small amount of samples.

A plurality of tensor mode algorithms have become a trend of the era. However, solving an objective function of STM is a non-convex optimization issue, in which solving by using an alternative projection method is required; the time complexity of the algorithm is high and a local minimum value occurs frequently.

SUMMARY OF THE INVENTION

In light of this, an embodiment of the invention provides a method for processing tensor data for pattern recognition and a computer device so as to solve the problems such as curse of dimensionality, over learning and small amount of samples occurred when the vector mode algorithms provided by the prior art process the tensor data and overcome the shortcomings of the tensor mode algorithms of the prior art. The algorithm of the invention aims at solve the limitations of the algorithms of the prior art, for example, the time complexity of the algorithms is high, and a local minimum value occurs frequently, etc.

On one hand, a method for processing tensor data for pattern recognition is provided; the method includes:

receiving an input training tensor data set;

introducing a within class scatter matrix into an objective function such that between class distance is maximized, at the same time, within class distance is minimized by the objective function;

constructing an optimal frame of the objective function of an optimal projection tensor machine subproblem;

transforming N vector modes of quadratic programming subproblems into a multiple quadratic programming problem under a single tensor mode, and constructing an optimal frame of an objective function of an optimal projection tensor machine problem;

according to lagrangian multiplier method, obtaining a dual problem of the optimal frame of the objective function, introducing a tensor rank one decomposition into calculation of tensor transvection, and obtaining a revised dual problem;

utilizing sequential minimal optimization algorithm to solve the revised dual problem and output an alagrangian optimal combination and an offset scalar b;

calculating a projection tensor $W_*$;

performing the rank one decomposition to the projection tensor $W_*$;

performing a back projection to a component obtained after performing the rank one decomposition to the projection tensor $W_*$;

performing rank one decomposition inverse operation to the component obtained after performing the back projection to obtain an optimal projection tensor W which is corresponded to the training tensor data set;

decision function construction phase: by the optimal projection tensor W which has been rank-one decomposed together with the offset scalar b, constructing a decision function;

application prediction phase: inputting to-be-predicted tensor data which has been rank-one decomposed into the decision function for prediction.

Furthermore, after introducing the within class scatter matrix into an objective function of an STM subproblem, through an eta coefficient the objection function of the quadratic programming problem of an n-th subproblem is changed into:

$$\min_{w^{(n)}, b^{(n)}, \xi^{(n)}} \frac{1}{2} \left[ \left( \|w^{(n)}\|_F^2 + \eta (w^{(n)})^T S_w^{(n)} w^{(n)} \right) \prod_{\substack{1 \leq i \leq N \\ i \neq n}} \left( \|w^{(i)}\|_F^2 + \eta (w^{(i)})^T S_w^{(n)} w^{(i)} \right) \right] + C \sum_{m=1}^{M} \xi_m^{(n)}$$

wherein, $S_w^{(n)}$ is an n-th order within class scatter matrix estimated after the training tensor data set is expanded along the n-th order; $w^{(n)}$ is an n-th order optimal projection vector of the training tensor data, n=1, 2, ... N; C is a penalty factor; $\xi_m^{(n)}$ is a slack variable; eta coefficient $\eta$ is configured to measure the importance of the within class scatter matrix.

Furthermore, the optimal frame of an objective function of an OPSTM problem is a combination of N vector modes of quadratic programming problems, which respectively corresponds to a subproblem; wherein, a quadratic programming problem of an n-th subproblem is:

$$\min_{w_*^{(n)}, b^{(n)}, \xi^{(n)}} \frac{1}{2} \|w_*^{(n)}\|_F^2 \prod_{\substack{1 \leq i \leq N \\ i \neq n}} \|w_*^{(i)}\|_F^2 + C \sum_{m=1}^{M} \xi_m^{(n)}$$

$$y_m \left( (w_*^{(n)})^T \left( V_m \prod_{\substack{1 \leq i \leq N \\ i \neq n}} \times_i w_*^{(i)} \right) + b^{(n)} \right) \geq 1 - \xi_m^{(n)}$$

S.t $$\xi_m^{(n)} \geq 0 \ m = 1, 2, \ldots M$$

wherein, $w_*^{(n)}$ is the n-th order projection vector of the training tensor data set; $w_*^{(n)} = \Lambda^{(n)1/2} P^{(n)T} w^{(n)}$, wherein $\Lambda^{(n)}$ and $P^{(n)}$ meet the equation, $P^{(n)T}(E+\eta S_w^{(n)})P^{(n)} = \Lambda^{(n)}$; E is an identity matrix;

$$V_m = X_m \prod_{i=1}^{N} \times_i \left[ (P^{(i)} \Lambda^{(i)1/2})^{-1} \right]^T$$

is tensor input data obtained after tensor input data $X_m$ in the training tensor data set is projected along each order; $X_i$ is an i-mode multiplication operator; $b^{(n)}$ is the n-th order offset scalar of the training tensor data set.

Furthermore, according to a formula $$\|W_*\|_F^2 = \prod_{n=1}^{N} \|w_*^{(n)}\|_F^2,$$

and a formula $(w_*^{(n)})^T(V_m \Pi_{1<i<N}^{i \neq n} \times_i w_*^{(i)}) = <W_*, V_m>$, transforming the N vector modes of quadratic programming subproblems into the multiple quadratic programming subproblem under a single tensor mode. A constructed optimal frame of the objective function of the OPSTM problem meets that:

$$\min_{W_*,b,\xi} \frac{1}{2}\|W_*\|_F^2 + C\sum_{m=1}^{M} \xi_m$$

$$y_m(\langle W_*, V_m \rangle + b) \geq 1 - \xi_m$$

S.t $$\xi_m \geq 0 \ m = 1, 2, \ldots M$$

wherein, $< >$ is a transvection operator, and $$\xi_m = \max_{n=1,2,\ldots N} \{\xi_m^{(n)}\}.$$

Furthermore, according to lagrangian multiplier method, an obtained dual problem of the optimal frame of the objective function is:

$$\max_{\alpha} \sum_{m=1}^{M} \alpha_m - \frac{1}{2} \sum_{i,j=1}^{M} \alpha_i \alpha_j y_i y_j \langle V_i, V_j \rangle$$

$$\sum_{m=1}^{M} (\alpha_m y_m) = 0$$

S.t $$0 < \alpha_m < C \ m = 1, 2, \ldots M;$$

introducing the tensor rank one decomposition into the calculation of the tensor transvection. An obtained revised dual problem is:

$$\max_{\alpha} \sum_{m=1}^{M} \alpha_m - \frac{1}{2} \sum_{i,j=1}^{M} \sum_{p=1}^{R} \sum_{q=1}^{R} \alpha_i \alpha_j y_i y_j \sum_{n=1}^{N} \langle v_{ip}^{(n)}, v_{jq}^{(n)} \rangle$$

$$\sum_{m=1}^{M} (\alpha_m y_m) = 0$$

S.t $$0 < \alpha_m < C \ m = 1, 2, \ldots M.$$

Furthermore, calculating the projection tensor $W_*$ according to a formula, $$W_* = \sum_{m=1}^{M} \alpha_m y_m V_m.$$

On the other hand, a computer device is provided. The computer device includes a storage medium with computer instructions stored therein. The computer instructions are configured to enable the computer device to execute a method for processing tensor data for pattern recognition for supervised learning under tensor mode; the method includes:

receiving an input training tensor data set;

introducing a within class scatter matrix into an objective function such that between class distance is maximized, at the same time, within class distance is minimized by the objective function;

constructing an optimal frame of an objective function of an optimal projection tensor machine subproblem;

transforming N vector modes of quadratic programming subproblems into a multiple quadratic programming problem under a single tensor mode, and constructing an optimal frame of an objective function of an optimal projection tensor machine problem;

obtaining a dual problem of the optimal frame of the objective function, introducing a tensor rank one decomposition into calculation of tensor transvection, and obtaining a revised dual problem according to lagrangian multiplier method;

utilizing sequential minimal optimization SMO algorithm to solve the revised dual problem and outputting an alagrangian optimal combination and an offset scalar b;

calculating a projection tensor $W_*$;

performing the rank one decomposition to the projection tensor $W_*$;

performing a back projection to a component obtained after performing the rank one decomposition to the projection tensor $W_*$;

performing rank one decomposition inverse operation to the component obtained after performing the back projection to obtain an optimal projection tensor W which is corresponded to the training tensor data set;

constructing a decision function construction phase and construct a decision function by the optimal projection tensor W which has been rank-one decomposed together with the offset scalar b; and inputting to-be-predicted tensor data which has been rank-one decomposed into the decision function for prediction in an application prediction phase.

Furthermore, through an eta coefficient η, after the within class scatter introducing unit introduces the within class scatter matrix into an objective function of an STM subproblem, the objection function of the quadratic programming problem of the n-th subproblem is changed into:

$$\min_{w^{(n)},b^{(n)},\xi^{(n)}} \frac{1}{2}\left[(\|w^{(n)}\|_F^2 + \eta((w^{(n)})^T S_w^{(n)} w^{(n)}))\right.$$

$$\left.\prod_{1<i<N}^{i \neq n} (\|w^{(i)}\|_F^2 + \eta((w^{(i)})^T S_w^{(n)} w^{(i)}))\right] + C\sum_{m=1}^{M} \xi_m^{(n)}$$

wherein, $S_w^{(n)}$ is an n-order within class scatter matrix estimated after the training tensor data set is expanded along the n-th order; $w^{(n)}$ is the n-th order optimal projection vector of the training tensor data, n=1, 2, . . . N; C is a penalty factor; $\xi_m^{(n)}$ is a slack variable; eta coefficient η is configured to measure the importance of the within class scatter matrix.

Furthermore, in the subproblem optimal frame constructing unit, the optimal frame of the objective function of the OPSTM problem is a combination of N vector modes of quadratic programming problems, which respectively corresponds to a subproblem; wherein, a quadratic programming problem of the n-th subproblem is:

$$\min_{w_*^{(n)}, b^{(n)}, \xi^{(n)}} \frac{1}{2}\|w_*^{(n)}\|_F^2 \prod_{1 \le i \le N}^{i \ne n} \|w_*^{(i)}\|_F^2 + C\sum_{m=1}^{M} \xi_m^{(n)}$$

$$y_m\left((w_*^{(n)})^T\left(V_m\prod_{1 \le i \le N}^{i \ne n} \times_i w_*^{(i)}\right) + b^{(n)}\right) \ge 1 - \xi_m^{(n)}$$

S.t $$\xi_m^{(n)} \ge 0 \ m = 1, 2, \ldots M$$

wherein, $w_*^{(n)}$ is the n-th order projection vector of the training tensor data set; $w_*^{(n)} = \Lambda^{(n)1/2}P^{(n)T}w^{(n)}$, wherein $\Lambda^{(n)}$ and $P^{(n)}$ meet the equation, $P^{(n)T}(E+\eta S_w^{(n)})P^{(n)} = \Lambda^{(n)}$; E is an identity matrix;

$$V_m = X_m \prod_{i=1}^{N} \times_i \left[(P^{(i)}\Lambda^{(i)1/2})^{-1}\right]^T$$

is tensor input data obtained after tensor input data $X_m$ in the training tensor data set is projected along each order; $X_i$ is an i-mode multiplication operator; $b^{(n)}$ is the n-th order offset scalar of the training tensor data set.

Furthermore, according to a formula $$\|W_*\|_F^2 = \prod_{n=1}^{N} \|w_*^{(n)}\|_F^2,$$

and a formula $(w_*^{(n)})^T(V_m\Pi_{1 \le i \le N}^{i \ne n} \times_i w_*^{(i)}) = <W_*, V_m>$, the problem optimal frame constructing unit transforms the N vector modes of quadratic programming subproblems into the multiple quadratic programming subproblem under a single tensor mode. A constructed optimal frame of the objective function of the OPSTM problem meets that:

$$\min_{W_*, b, \xi} \frac{1}{2}\|W_*\|_F^2 + C\sum_{m=1}^{M} \xi_m$$

$$y_m(\langle W_*, V_m\rangle + b) \ge 1 - \xi_m$$

S.t $$\xi_m \ge 0 \ m = 1, 2, \ldots M$$

wherein, < > is a transvection operator, and $$\xi_m = \max_{n=1,2,\ldots N} \{\xi_m^{(n)}\}.$$

Furthermore, according to lagrangian multiplier method, the dual problem solving unit obtains the dual problem of the optimal frame of the objective function, which is:

$$\max_{\alpha} \sum_{m=1}^{M} \alpha_m - \frac{1}{2}\sum_{i,j=1}^{M} \alpha_i\alpha_j y_i y_j \langle V_i, V_j\rangle$$

$$\sum_{m=1}^{M} (\alpha_m y_m) = 0$$

S.t $$0 < \alpha_m < C \ m = 1, 2, \ldots M;$$

the dual problem solving unit introduces the tensor rank one decomposition into the calculation of the tensor transvection. An obtained revised dual problem is:

$$\max_{\alpha} \sum_{m=1}^{M} \alpha_m - \frac{1}{2}\sum_{i,j=1}^{M} \sum_{p=1}^{R} \sum_{q=1}^{R} \alpha_i\alpha_j y_i y_j \prod_{n=1}^{N} \langle v_{ip}^{(n)}, v_{jq}^{(n)}\rangle \sum_{m=1}^{M} (\alpha_m y_m) = 0$$

S.t $$0 < \alpha_m < C \ m = 1, 2, \ldots M.$$

Furthermore, the projection tensor calculating unit calculates the projection tensor $W_*$ according to a formula, $$W_* = \sum_{m=1}^{M} \alpha_m y_m V_m.$$

In the embodiments of the present invention, N vector modes of quadratic programming problems are transformed into a multiple quadratic programming problem under a single tensor mode. The transformed optimal frame of the objective function is the optimal frame of the objective function of the OPSTM problem. This can reduce the number of model parameters significantly, overcome issues such as curse of dimensionality, over learning and small amount of samples occurred when traditional vector mode algorithms process the tensor data, which ensures efficient processing, at the same time, highlights excellent classifying effects. Above all, the algorithms provided by the embodiments of the invention can process tensor data effectively and directly in tensor field, at the same time, possesses features of optimal classifying ability as well as strong practicability and popularization.

DETAILED DESCRIPTION OF THE PREFERRED EMBODIMENT

In order to make the purposes, technical solutions and advantages of the present invention clearer, the invention is described hereinafter in further details with reference to the drawings and embodiments. It should be understood that the specific embodiments described herein are merely for explaining the invention, but not intended for limitation.

In one embodiment of the invention, receiving an input training tensor data set; introducing a within class scatter matrix into an objective function such that between class distance is maximized, at the same time, within class distance is minimized by the objective function; constructing an optimal frame of the objective function of an optimal projection tensor machine OPSTM subproblem; constructing an optimal frame of an objective function of an OPSTM problem; according to lagrangian multiplier method, obtaining a dual problem of the optimal frame of the objective function, introducing a tensor rank one decomposition into calculation of tensor transvection, and obtaining a revised dual problem; utilizing sequential minimal optimization SMO algorithm to solve the revised dual problem and output a lagrangian optimal combination and an offset scalar; calculating a projection tensor; performing the rank one decomposition to the projection tensor; performing a back projection to a component obtained after performing the rank one decomposition to the projection tensor; performing rank one decomposition inverse operation to the component obtained after performing the back projection to obtain an optimal projection tensor W which is corresponded to the training tensor data set; decision function construction phase: by the optimal projection tensor W which has been rank-one decomposed together with the offset scalar, constructing a decision function; application prediction phase: inputting to-be-predicted tensor data which has been rank-one decomposed into the decision function for prediction.

The implementation of the present invention will be described in detail with reference to specific embodiments:

The First Embodiment

Figure 1:
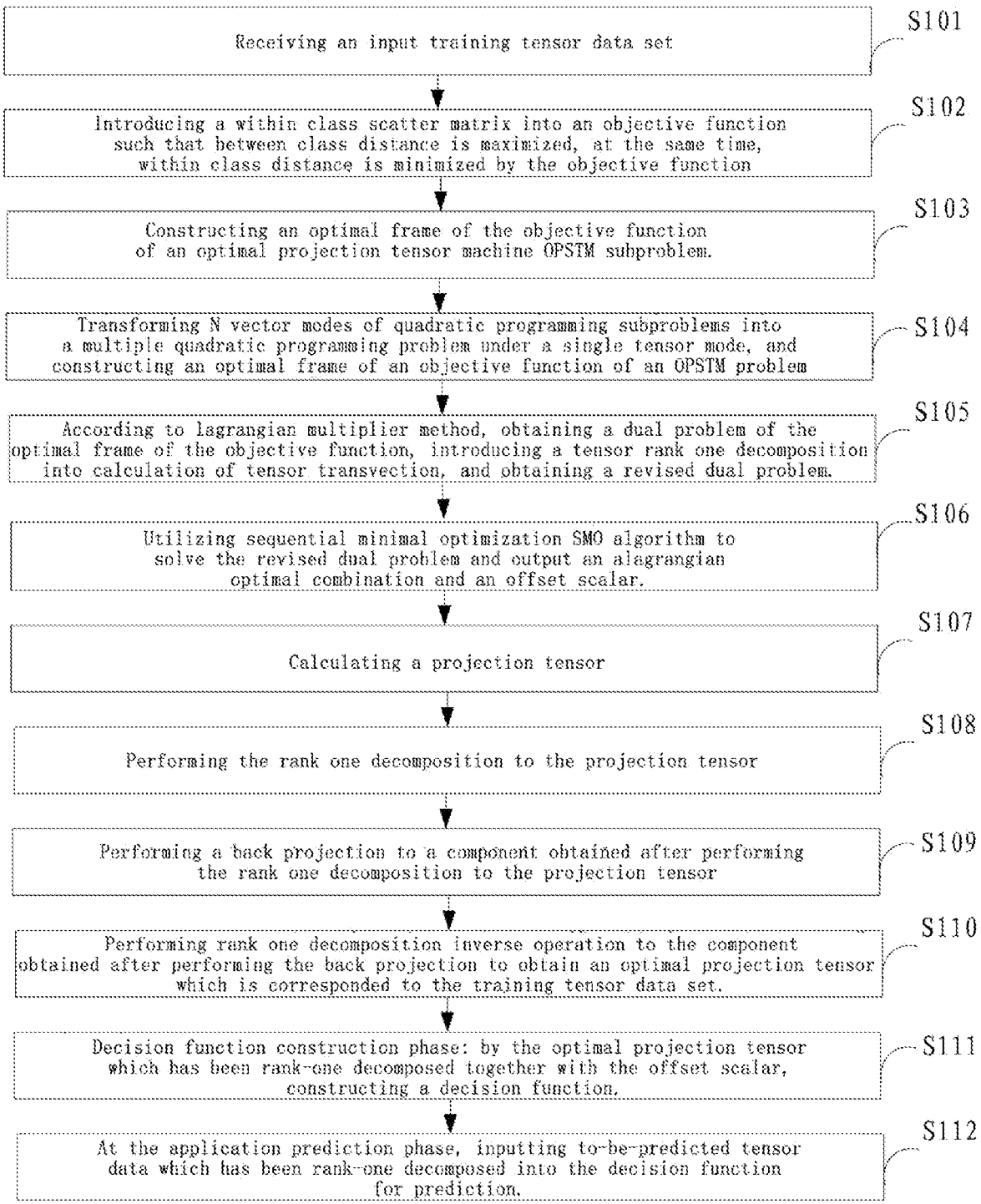
FIG. 1 is an implementation flow chart of a method for processing tensor data for pattern recognition of the invention.

FIG. 1 shows an implementation process of a method for processing tensor data for pattern recognition, which is an optimization method for supervised learning under tensor mode provided by the first embodiment of the present invention. The details are as follows:

Step 101, receiving an input training tensor data set.

In the embodiment of the invention, let the training tensor data set be {Xm, ym|m=1, 2 ... M}, wherein $X_m$ represents tensor input data, $y_m \in \{+1, -1\}$ represents a label.

Take a gray level image for example, sample points are stored in a form of a second-order tensor (matrix), and all the sample points which are in a form of a column vector comprise an input data set. In a similar way, a label set is also a column vector; furthermore, the location of each label is corresponded to the location of the corresponding sample point.

$$X = \begin{bmatrix} X_1 \\ X_2 \\ \vdots \\ X_M \end{bmatrix} Y = \begin{bmatrix} y_1 \\ y_2 \\ \vdots \\ y_M \end{bmatrix}$$

Step 102, introducing a within class scatter matrix into an objective function such that between class distance is maximized, at the same time, within class distance is minimized by the objective function.

In the embodiment of the invention, the optimal frame of the objective function of the support tensor machine (STM) problem is a combination of N vector modes of quadratic programming problems, which respectively correspond to a subproblem, wherein, a quadratic programming problem of the n-th subproblem is:

$$\min_{w^{(n)}, b^{(n)}, \xi^{(n)}} \frac{1}{2} \|w^{(n)}\|_F^2 \prod_{\substack{1 \le i \le N \\ i \ne n}} \|w^{(i)}\|_F^2 + C \sum_{m=1}^{M} \xi_m^{(n)} \quad (1\text{-}1)$$

$$y_m \left( (w^{(n)})^T \left( X_m \prod_{\substack{1 \le i \le N \\ i \ne n}} \times_i w^{(i)} \right) + b^{(n)} \right) \ge 1 - \xi_m^{(n)} \quad (1\text{-}2)$$

S.t $$\xi_m^{(n)} \ge 0 \quad m = 1, 2, \ldots M \quad (1\text{-}3)$$

wherein, $w^{(n)}$: the n-th order optimal projection vector of the training tensor data set, n=1, 2, . . . N;

$b^{(n)}$: the n-th order offset scalar of the training tensor data set, n=1, 2, . . . N;

C: a penalty factor;

$\xi_m^{(n)}$: a slack variable.

After introducing the within class scatter matrix into an objective function of an STM subproblem, through an eta coefficient η, the objection function of the quadratic programming problem of the n-th subproblem is changed into:

$$\min_{w^{(n)}, b^{(n)}, \xi^{(n)}} \frac{1}{2} \Big[ \big( \|w^{(n)}\|_F^2 + \eta((w^{(n)})^T S_w^{(n)} w^{(n)}) \big) \quad (1\text{-}4)$$

$$\prod_{\substack{1 < i < N \\ i \ne n}} \big( \|w^{(i)}\|_F^2 + \eta((w^{(i)})^T S_w^{(n)} w^{(i)}) \big) \Big] + C \sum_{m=1}^{M} \xi_m^{(n)}$$

wherein, $S_w^{(n)}$ is the n-th order within class scatter matrix estimated after the training tensor data set is expanded along the n-th order; $w^{(n)}$ herein possesses Fisher criterion effect, "maximum between class distance, minimum within class distance" at the n-th order of the training tensor data set; eta coefficient η is configured to measure the importance of the within class scatter.

Step 103, constructing an optimal frame of the objective function of an optimal projection tensor machine OPSTM subproblem.

In the embodiment of the invention, the optimal frame of an objective function of an optimal projection tensor machine OPSTM problem is a combination of N vector modes of quadratic programming problems, which respectively correspond to a subproblem; wherein, a quadratic programming problem of the n-th subproblem is:

$$\min_{w_*^{(n)}, b^{(n)}, \xi^{(n)}} \frac{1}{2} \|w_*^{(n)}\|_F^2 \prod_{\substack{1 \le i \le N \\ i \ne n}} \|w_*^{(i)}\|_F^2 + C \sum_{m=1}^{M} \xi_m^{(n)} \quad (2\text{-}1)$$

$$y_m \left( (w_*^{(n)})^T \left( V_m \prod_{\substack{1 \le i \le N \\ i \ne n}} \times_i w_*^{(i)} \right) + b^{(n)} \right) \ge 1 - \xi_m^{(n)} \quad (2\text{-}2)$$

S.t $$\xi_m^{(n)} \ge 0 \quad m = 1, 2, \ldots M \quad (2\text{-}3)$$

wherein, $w_*^{(n)}$: the n-th order projection vector of the training tensor data set; $w_*^{(n)} = \Lambda^{(n)1/2} P^{(n)T} w^{(n)}$ n=1, 2, . . . N; $w^{(n)}$: the n-th order optimal projection vector of the training tensor data set of formula (1-4); $\Lambda^{(n)}$ and $P^{(n)}$ meet the equation, $P^{(n)T}(E+\eta S_w^{(n)})P^{(n)} = \Lambda^{(n)}$; E is an identity matrix;

$$V_m = X_m \prod_{i=1}^{N} \times_i \left[(P^{(i)}\Lambda^{(i)1/2})^{-1}\right]^T$$

is tensor input data obtained after tensor input data $X_m$ is projected along each order; $X_i$ is an i-mode multiplication operator.

Step 104, transforming N vector modes of quadratic programming subproblems into a multiple quadratic programming problem under a single tensor mode, and constructing an optimal frame of an objective function of an OPSTM problem.

In the embodiment of the invention, $$\|W_*\|_F^2 = \qquad\qquad \text{Eq. 1}$$

$$\|w_*^{(1)} \circ w_*^{(2)} \circ \ldots w_*^{(N)}\|_F^2 = \sum_{i_1=1}^{I_1}\sum_{i_2=1}^{I_2}\ldots\sum_{i_N=1}^{I_N} w_{*i_1,i_2\ldots i_N}^2 =$$

$$\sum_{i_1=1}^{I_1}\sum_{i_2=1}^{I_2}\ldots\sum_{i_N=1}^{I_N} \left(w_{*i_1}^{(1)} \cdot w_{*i_2}^{(2)} \ldots w_{*i_N}^{(N)}\right)^2 =$$

$$\langle w_*^{(1)}, w_*^{(1)}\rangle\langle w_*^{(2)}, w_*^{(2)},\rangle \ldots \langle w_*^{(N)}, w_*^{(N)}\rangle = \prod_{n=1}^{N} \|w_*^{(n)}\|_F^2$$

$$(w_*^{(n)})^T\left(V_m \prod_{i<i<N}^{i\neq n} \times_i w_*^{(i)}\right) = \qquad \text{Eq. 2}$$

$$V_m \times_1 w_*^{(1)} \times_2 w_*^{(2)} \times \ldots \times_{(n-1)} w_*^{(n-1)} \times_n w_*^{(n)} \times_{(n+1)} w_*^{(n+1)} \ldots \times_N$$

$$w_*^{(N)} = \sum_{i_1=1}^{I_1}\sum_{i_2=1}^{I_2}\ldots\sum_{i_N=1}^{I_N} v_{m,i_1,i_2,\ldots i_N} w_{*i_1}^{(1)} w_{*i_2}^{(2)} \ldots w_{*i_N}^{(N)} =$$

$$\sum_{i_1=1}^{I_1}\sum_{i_2=1}^{I_2}\ldots\sum_{i_N=1}^{I_N} v_{m,i_1,i_2,\ldots i_N} w_{*i_1,i_2,\ldots i_N} = \langle W_*, V_m\rangle.$$

wherein, $\| \|_F^2$ represents a norm and "$\circ$" represents an outer product operator. According to the formulas, Eq. 1 and Eq. 2, $$\|W_*\|_F^2 = \prod_{n=1}^{N} \|w_*^{(n)}\|_F^2,$$

and $(w_*^{(n)})^T(V_m \Pi_{1<i<N}^{i\neq n} \times_i w_*^{(i)}) = \langle W_*, V_m\rangle$. Therefore, vector mode of quadratic programming problems of N subproblems can be transformed into a multiple quadratic programming problem under a single tensor mode, which means the optimal frame of an objective function of an OPSTM problem is:

$$\min_{W_*, b, \xi} \frac{1}{2}\|W_*\|_F^2 + C\sum_{m=1}^{M} \xi_m \qquad (3\text{-}1)$$

$$\text{S.t } y_m(\langle W_*, V_m\rangle + b) \geq 1 - \xi_m \qquad (3\text{-}2)$$

$$\xi_m \geq 0 \quad m = 1, 2, \ldots M \qquad (3\text{-}3)$$

wherein, $W_*$ is a projection tensor; $\langle\rangle$ is a transvection operator, and $$\xi_m = \max_{n=1,2,\ldots N} \{\xi_m^{(n)}\}.$$

Through the Eq. 1 and Eq. 2, N vector modes of quadratic programming problems are transformed into a multiple quadratic programming problem under a single tensor mode. The transformed optimal frame of the objective function is the optimal frame of the objective function of the OPSTM problem. This can reduce the number of model parameters significantly, overcome issues such as curse of dimensionality, over learning and small sample occurred when vector mode algorithms process the tensor data.

Step 105, according to lagrangian multiplier method, obtaining a dual problem of the optimal frame of the objective function, introducing a tensor rank one decomposition into calculation of tensor transvection, and obtaining a revised dual problem.

In the embodiment, according to lagrangian multiplier method, a dual problem of the optimal frame [(3-1), (3-2), (3-3)] of the objection function of the OPSTM problem is obtained, wherein $\alpha_m$ is a lagrangian multiplier.

$$\max_{\alpha} \sum_{m=1}^{M} \alpha_m - \frac{1}{2}\sum_{i,j=1}^{M} \alpha_i\alpha_j y_i y_j \langle V_i, V_j\rangle \qquad (4\text{-}1)$$

$$\sum_{m=1}^{M} (\alpha_m y_m) = 0 \qquad (4\text{-}2)$$

S.t $$0 < \alpha_m < C \quad m = 1, 2, \ldots M \qquad (4\text{-}3)$$

A tensor CP (CANDECOMP/PARAFAC) is decomposed and introduced to the calculation of tensor transvection.

Rank one decompositions of tensor data $V_i$, $V_j$ are respectively:

$$V_i = \sum_{r=1}^{R} v_{ir}^{(1)} \circ v_{ir}^{(2)} \circ \ldots \circ v_{ir}^{(N)}$$

$$V_j = \sum_{r=1}^{R} v_{jr}^{(1)} \circ v_{jr}^{(2)} \circ \ldots \circ v_{jr}^{(N)} \text{ and}$$

$$\langle V_i, V_j\rangle = \sum_{p=1}^{R}\sum_{q=1}^{R}\prod_{n=1}^{N} \langle v_{ip}^{(n)}, v_{jq}^{(n)}\rangle$$

Therefore, the dual problem can be changed into:

$$\max_{\alpha} \sum_{m=1}^{M} \alpha_m - \frac{1}{2}\sum_{i,j=1}^{M}\sum_{p=1}^{R}\sum_{q=1}^{R} \alpha_i\alpha_j y_i y_j \prod_{n=1}^{N} \langle v_{ip}^{(n)}, v_{jq}^{(n)}\rangle \qquad (4\text{-}4)$$

$$\sum_{m=1}^{M} (\alpha_m y_m) = 0 \qquad (4\text{-}2)$$

S.t $$0 < \alpha_m < C \quad m = 1, 2, \ldots M \qquad (4\text{-}3)$$

In the objection function (4-1) of the dual problem, a tensor rank one decomposition auxiliary calculation, $$\langle V_i, V_j \rangle = \sum_{p=1}^{R} \sum_{q=1}^{R} \prod_{n=1}^{N} \langle v_{ip}^{(n)}, v_{jq}^{(n)} \rangle,$$

is introduced into the tensor transvection calculation part, which further reduces calculation complexity and storage cost, at the same time, the tensor rank one decomposition can obtain a more compact and more meaningful representation of a tensor objection, extract structural information and internal correlation of the tensor data more effectively, and avoid a time-consuming alternative projection iterative process of the tensor mode algorithms of the prior art.

Step 106, utilizing sequential minimal optimization SMO algorithm to solve the revised dual problem and output an alagrangian optimal combination $\alpha=[\alpha_1, \alpha_2, \ldots \alpha_M]$ and an offset scalar b.

Step 107, calculating a projection tensor $W_*$.

In the embodiment of the invention, the projection tensor $W_*$ is calculated according to the formula $$W_* = \sum_{m=1}^{M} \alpha_m y_m V_m.$$

Step 108, performing the rank one decomposition to the projection tensor $W_*$.

In the embodiment of the invention, the rank one decomposition is performed to the projection tensor $W_*$, and the formula $W_* = w_*^{(1)} \circ w_*^{(2)} \circ \ldots w_*^{(N)}$ is obtained.

Step 109, performing a back projection to a component obtained after performing the rank one decomposition to the projection tensor $W_*$.

In the embodiment of the invention, the back projection to a component is performed after performing the rank one decomposition to the projection tensor $W_*$ to obtain the formula $w^{(n)} = (\Lambda^{(n)1/2} P^{(n)})^{-1} w_*^{(n)}$, wherein $w^{(n)}$ corresponds to the optimal projection vector of (1-4), and is the n-th order optimal projection vector of the training tensor data set, n=1, 2, . . . N.

Step 110, performing rank one decomposition inverse operation to the component obtained after performing the back projection to obtain an optimal projection tensor W which is corresponded to the training tensor data set.

In the embodiment of the invention, the components obtained after performing back projection are blended (rank one decomposition inverse operation) into the optimal projection tensor W, $W = w^{(1)} \circ w^{(2)} \circ \ldots w^{(N)}$. therefore, the optimal projection tensor W can embody Fisher criterion at each order.

Step 111, decision function construction phase: by the optimal projection tensor W which has been rank-one decomposed together with the offset scalar b, constructing a decision function.

In the embodiment of the invention, at the decision function construction phase, the rank one decomposition should be performed to the optimal projection tensor W, the decomposed optimal projection tensor W and the offset scalar b are used for constructing the decision function:

$$y(X) = \text{sign}\left[\prod_{n=1}^{N} \sum_{p=1}^{R} \sum_{q=1}^{R} \langle w_p^{(n)}, x_q^{(n)} \rangle + b\right].$$

Step 112, at the application prediction phase, inputting to-be-predicted tensor data which has been rank-one decomposed into the decision function for prediction.

In the embodiment of the invention, at the application prediction phase, the to-be-predicted tensor data which has been performed rank-one decomposed is input into the decision function for prediction.

Compared with the prior art, the embodiment possesses the following advantages: 1) N vector modes of quadratic programming problems are transformed into a multiple quadratic programming problem under a single tensor mode. The optimal frame of the transformed objective function is the optimal frame of the objective function of the OPSTM problem. This can reduce the number of model parameters significantly, overcome issues such as curse of dimensionality, over learning and small sample occurred when traditional vector mode algorithms process the tensor data, which ensures high-activity processing, at the same time, highlights excellent classifying effects. Above all, the algorithms provided by the embodiments of the invention can process tensor data effectively and directly in tensor field, at the same time, possesses a feature of optimal classifying ability as well as strong practicability and popularization. 2) the within scatter matrix is introduced into the object function, which can receive and process the tensor data directly in the tensor field, and the output optimal projection tensor W can embody the Fisher criterion effect, "maximum between class distance, minimum within class distance" at each order. 3) In the objection function (4-1) of the dual problem, a tensor rank one decomposition auxiliary calculation, $$\langle V_i, V_j \rangle = \sum_{p=1}^{R} \sum_{q=1}^{R} \prod_{n=1}^{N} \langle v_{ip}^{(n)}, v_{jq}^{(n)} \rangle,$$

is introduced into the tensor transvection calculation part, which further reduces calculation complexity and storage cost, at the same time, the tensor rank one decomposition can obtain a more compact and more meaningful representation of the tensor objection, and extract structural information and internal correlation of the tensor data more effectively, and avoid a time-consuming alternative projection iterative process.

It should be understood that the serial number of each step in this embodiment does not signify the execution sequence; the execution sequence of each step should be determined according to its function and internal logic, and should not form any limitation to the implementation process of the embodiment of the invention.

It should be understood by those skilled in the art that the whole or partial steps of the methods in each embodiment can be achieved by relevant hardware instructed by program, and the corresponding program can be stored in a computer-readable storage medium; the storage medium can be for example ROM/RAM, magnetic disk or light disk, etc.

The Second Embodiment

Figure 2:
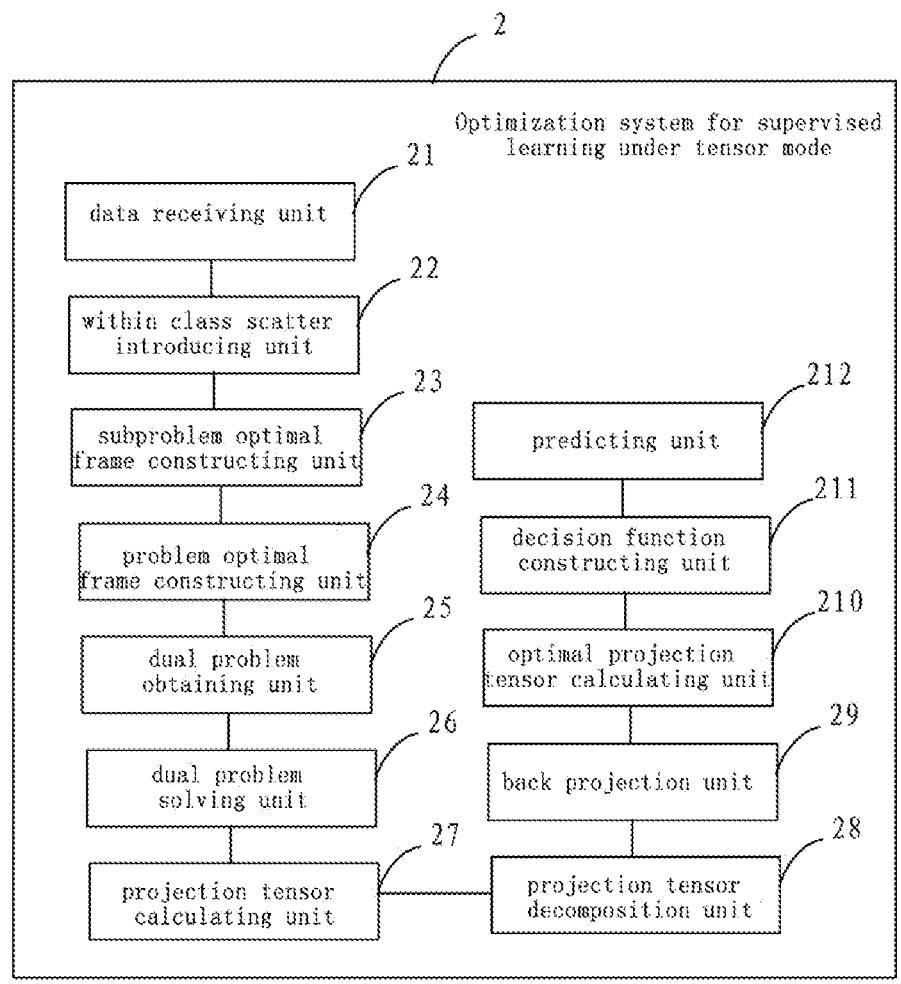
FIG. 2 is a system for processing tensor data for pattern recognition of the invention.

FIG. 2 shows a specific structural block diagram of a system for processing tensor data for pattern recognition provided by the second embodiment of the invention. For illustration purposes, merely the part relevant to the embodiment of the invention is shown. The optimization system 2 for supervised learning under tensor mode includes: a data receiving unit 21, a within class scatter introducing unit 22, a subproblem optimal frame constructing unit 23, a problem optimal frame constructing unit 24, a dual problem obtaining unit 25, a dual problem solving unit 26, a projection tensor calculating unit 27, a projection tensor decomposition unit 28, a back projection unit 29, an optimal projection tensor calculating unit 210, a decision function constructing unit 211 and a predicting unit 212.

The data receiving unit 21 is configured to receive an input training tensor data set;

The within class scatter introducing unit 22 is configured to introduce a within class scatter matrix into an objective function such that between class distance is maximized, at the same time, within class distance is minimized by the objective function;

The subproblem optimal frame constructing unit 23 is configured to construct an optimal frame of an objective function of an optimal projection tensor machine OPSTM subproblem;

The problem optimal frame constructing unit 24 is configured to transform N vector modes of quadratic programming subproblems into a multiple quadratic programming problem under a single tensor mode, and construct an optimal frame of an objective function of an OPSTM problem;

The dual problem obtaining unit 25 is configured to obtain a dual problem of the optimal frame of the objective function, introduce tensor rank one decomposition into calculation of tensor transvection, and obtain a revised dual problem according to lagrangian multiplier method;

The dual problem solving unit 26 is configured to utilize sequential minimal optimization SMO algorithm to solve the revised dual problem and output a lagrangian optimal combination and an offset scalar b;

The projection tensor calculating unit 27 is configured to calculate a projection tensor $W_*$;

The projection tensor decomposition unit 28 is configured to perform the rank one decomposition to the projection tensor $W_*$;

The back projection unit 29 is configured to perform a back projection to a component obtained after performing the rank one decomposition to the projection tensor $W_*$;

The optimal projection tensor calculating unit 210 is configured to perform rank one decomposition inverse operation to the component obtained after performing the back projection to obtain an optimal projection tensor W which is corresponded to the training tensor data set;

The decision function constructing unit 211 is configured to construct a decision function construction phase and construct a decision function by the optimal projection tensor W which has been rank-one decomposed together with the offset scalar b;

The predicting unit 212 is configured to input to-be-predicted tensor data which has been rank-one decomposed into the decision function for prediction in the application prediction phase.

Furthermore, through an eta coefficient η, after the within class scatter introducing unit 22 introduces the within class scatter matrix into an objective function of an STM subproblem, the objection function of the quadratic programming problem of the n-th subproblem is changed into:

$$\min_{w^{(n)}, b^{(n)}, \xi^{(n)}} \frac{1}{2} \left[ \left( \|w^{(n)}\|_F^2 + \eta \left( (w^{(n)})^T S_w^{(n)} w^{(n)} \right) \right) \right.$$

$$\left. \prod_{\substack{1 \leq i < N \\ i \neq n}} \left( \|w^{(i)}\|_F^2 + \eta \left( (w^{(i)})^T S_w^{(n)} w^{(i)} \right) \right) \right] + C \sum_{m=1}^{M} \xi_m^{(n)}$$

wherein, $S_w^{(n)}$ is an n-order within class scatter matrix estimated after the training tensor data set is expanded along the n-th order; $w^{(n)}$ is the n-th order optimal projection vector of the training tensor data, n=1, 2, . . . N; C is a penalty factor; $\xi_m^{(n)}$ is a slack variable; eta coefficient η is configured to measure the importance of the within class scatter matrix.

Furthermore, in the subproblem optimal frame constructing unit 23, the optimal frame of the objective function of the OPSTM problem is a combination of N vector modes of quadratic programming problems, which respectively corresponds to a subproblem; wherein a quadratic programming problem of the n-th subproblem is:

$$\min_{w_*^{(n)}, b^{(n)}, \xi^{(n)}} \frac{1}{2} \|w_*^{(n)}\|_F^2 \prod_{\substack{1 \leq i \leq N \\ i \neq n}} \|w^{(i)}\|_F^2 + C \sum_{m=1}^{M} \xi_m^{(n)}$$

$$\text{S.t.} \quad y_m \left( (w_*^{(n)})^T \left( V_m \prod_{\substack{1 \leq i \leq N \\ i \neq n}} \times_i w_*^{(i)} \right) + b^{(n)} \right) \geq 1 - \xi_m^{(n)}$$

$$\xi_m^{(n)} \geq 0 \quad m = 1, 2, \dots M$$

wherein, $w_*^{(n)}$ is the n-th order projection vector of the training tensor data set; $w_*^{(n)} = \Lambda^{(n)1/2} P^{(n)T} w^{(n)}$, wherein $\Lambda^{(n)}$ and $P^{(n)}$ meet the equation, $P^{(n)T}(E + \eta S_w^{(n)}) P^{(n)} = \Lambda^{(n)}$; E is an identity matrix;

$$V_m = X_m \prod_{i=1}^{N} \times_i \left[ (P^{(i)} \Lambda^{(i)1/2})^{-1} \right]^T$$

is tensor input data obtained after tensor input data $X_m$ in the training tensor data set is projected along each order; $X_i$ is an i-mode multiplication operator; $b^{(n)}$ is the n-th order offset scalar of the training tensor data set.

Furthermore, according to a formula $$\|W_*\|_F^2 = \prod_{n=1}^{N} \|w_*^{(n)}\|_F^2,$$

and a formula $(w_*^{(n)})^T (V_m \Pi_{1 \leq i < N}^{i \neq n} \times_i w_*^{(i)}) = \langle W_*, V_m \rangle$, the problem optimal frame constructing unit 24 transforms the N vector modes of quadratic programming subproblems into the multiple quadratic programming subproblem under a single tensor mode. A constructed optimal frame of the objective function of the OPSTM problem meets that:

$$\min_{W_*, b, \xi} \frac{1}{2} \|W_*\|_F^2 + C \sum_{m=1}^{M} \xi_m$$

$$\text{S.t.} \quad y_m (\langle W_*, V_m \rangle + b) \geq 1 - \xi_m$$

$$\xi_m \geq 0 \quad m = 1, 2, \dots M$$

wherein, < > is a transvection operator, and $$\xi_m = \max_{n=1,2,\ldots N} \{\xi_m^{(n)}\}.$$

Furthermore, according to lagrangian multiplier method, the dual problem solving unit 26 obtains the dual problem of the optimal frame of the objective function, which is:

$$\max_\alpha \sum_{m=1}^M \alpha_m - \frac{1}{2}\sum_{i,j=1}^M \alpha_i \alpha_j y_i y_j \langle V_i, V_j \rangle$$

$$\text{S.t.} \sum_{m=1}^M (\alpha_m y_m) = 0$$

$$0 < \alpha_m < C \ m = 1, 2, \ldots M.$$

The dual problem solving unit 26 introduces the tensor rank one decomposition into the calculation of the tensor transvection. An obtained revised dual problem is:

$$\max_\alpha \sum_{m=1}^M \alpha_m - \frac{1}{2} \sum_{i,j=1}^M \sum_{p=1}^R \sum_{q=1}^R \alpha_i \alpha_j y_i y_j \prod_{n=1}^N \langle V_{ip}^{(n)}, V_{jq}^{(n)} \rangle$$

$$\text{S.t.} \sum_{m=1}^M (\alpha_m y_m) = 0$$

$$0 < \alpha_m < C \ m = 1, 2, \ldots M.$$

Furthermore, the projection tensor calculating unit 27 calculates the projection tensor $W_*$ according to a formula, $$W_* = \sum_{m=1}^M \alpha_m y_m V_m.$$

The optimization system for supervised learning under tensor mode provided by the embodiment of the invention can be applied to the corresponding method of the first embodiment. Please refer to the description of the first embodiment, which would not be further described herein.

Those skilled in the art should understand that the exemplary units and algorithm steps described in accompany with the embodiments disclosed in the specification can be achieved by electronic hardware, or the combination of computer software with electronic hardware. Whether these functions are executed in a hardware manner or a software manner depends on the specific applications and design constraint conditions of the technical solutions. With respect to each specific application, a professional technician can achieve the described functions utilizing different methods, and these achievements should not be deemed as going beyond the scope of the invention.

Those skilled in the art can be clearly understood that for convenience and briefness, the specific working process of the described system, apparatus and unit can refer to the corresponding process of the above method embodiment, which would be further described herein.

It should be understood that the systems, devices and methods disclosed in several embodiments provided by the present application can be achieved in alternative ways. For example, the described device embodiments are merely schematically. For example, the division of the units is merely a division based on logic function, whereas the units can be divided in other ways in actual realization; for example, a plurality of units or components can be grouped or integrated into another system, or some features can be omitted or not executed. Furthermore, the shown or discussed mutual coupling or direct coupling or communication connection can be achieved by indirect coupling or communication connection of some interfaces, devices or units in electric, mechanical or other ways.

The units described as isolated elements can be or not be separated physically; an element shown as a unit can be or not be physical unit, which means that the element can be located in one location or distributed at multiple network units. Some or all of the units can be selected according to actual needs to achieve the purpose of the schemes of the embodiments.

Furthermore, each functional unit in each embodiment of the present invention can be integrated into a processing unit, or each unit can exist in isolation, or two or more than two units can be integrated into one unit.

If the integrated unit is achieved in software functional unit and sold or used as an independent product, the integrated unit can be stored in a computer-readable storage medium. Based on this consideration, the substantial part, or the part that is contributed to the prior art of the technical solution of the present invention, or part or all of the technical solutions can be embodied in a software product. The computer software product is stored in a storage medium, and includes several instructions configured to enable a computer device (can be a personal computer, device, network device, and so on) to execute all or some of the steps of the method of each embodiment of the present invention. The storage medium includes a U disk, a mobile hard disk, a read-only memory (ROM, Read-Only Memory), a random access memory (RAM, Random Access Memory), a disk or a light disk, and other various mediums which can store program codes.

The above contents are merely specific embodiments of the present invention, however, the protection scope of the present invention should not be limited by this. Any person skilled in the art can easily envisage alternations and displacements within the technical scope disclosed by the invention, which should also be within the protection scope of the present invention. Therefore, the protection scope of the present invention should be subjected to the protection scope of the claims.

What is claimed is:

1. A method for processing tensor data for pattern recognition, wherein the method comprises:
   receiving an input training tensor data set;
   introducing a within class scatter matrix into an objective function such that between class distance is maximized, at the same time, within class distance is minimized by the objective function;
   constructing an optimal frame of the objective function of an optimal projection tensor machine subproblem;
   transforming N vector modes of quadratic programming subproblems into a multiple quadratic programming problem under a single tensor mode, and constructing an optimal frame of an objective function of an optimal projection tensor machine problem;
   according to lagrangian multiplier method, obtaining a dual problem of the optimal frame of the objective function, introducing a tensor rank one decomposition into calculation of tensor transvection, and obtaining a revised dual problem;

utilizing sequential minimal optimization algorithm to solve the revised dual problem and output an alagrangian optimal combination and an offset scalar b;

calculating a projection tensor $W_*$;

performing the rank one decomposition to the projection tensor $W_*$;

performing a back projection to a component obtained after performing the rank one decomposition to the projection tensor $W_*$;

performing rank one decomposition inverse operation to the component obtained after performing the back projection to obtain an optimal projection tensor W which is corresponded to the training tensor data set;

decision function construction phase: by the optimal projection tensor W which has been rank-one decomposed together with the offset scalar b, constructing a decision function;

application prediction phase: inputting to-be-predicted tensor data which has been rank-one decomposed into the decision function for prediction.

2. A computer device, comprising a storage medium with computer instructions stored thereon, wherein the computer instructions are configured to enable the computer device to execute a method for processing tensor data for pattern recognition, wherein the method comprises:

receiving an input training tensor data set;

introducing a within class scatter matrix into an objective function such that between class distance is maximized, at the same time, within class distance is minimized by the objective function;

constructing an optimal frame of an objective function of an optimal projection tensor machine subproblem;

transforming N vector modes of quadratic programming subproblems into a multiple quadratic programming problem under a single tensor mode, and constructing an optimal frame of an objective function of an optimal projection tensor machine problem;

obtaining a dual problem of the optimal frame of the objective function, introducing a tensor rank one decomposition into calculation of tensor transvection, and obtaining a revised dual problem according to lagrangian multiplier method;

utilizing sequential minimal optimization algorithm to solve the revised dual problem and outputting an alagrangian optimal combination and an offset scalar b;

calculating a projection tensor $W_*$;

performing the rank one decomposition to the projection tensor $W_*$;

performing a back projection to a component obtained after performing the rank one decomposition to the projection tensor $W_*$;

performing rank one decomposition inverse operation to the component obtained after performing the back projection to obtain an optimal projection tensor W which is corresponded to the training tensor data set;

constructing a decision function by the optimal projection tensor W which has been rank-one decomposed together with the offset scalar b; and inputting to-be-predicted tensor data which has been rank-one decomposed into the decision function for prediction in an application prediction phase.

* * * * *